Aug. 17, 1965   R. W. TACCONE   3,201,110
CUSHIONING DEVICE
Filed Nov. 7, 1963

INVENTOR.
RUSSELL W. TACCONE
BY
Charles L. Lovercheck
Attorney

United States Patent Office 3,201,110
Patented Aug. 17, 1965

3,201,110
CUSHIONING DEVICE
Russell W. Taccone, Erie, Pa., assignor to Taccone Corporation, Erie, Pa., a corporation of Pennsylvania
Filed Nov. 7, 1963, Ser. No. 322,243
1 Claim. (Cl. 267—1)

This invention relates to cushioning devices or shock absorber devices and, more particularly, to shock absorber devices suitable for use in checking the movement of heavy mechanical apparatus such as foundry flasks and equipment.

Present cushions and stock absorbers of the type disclosed herein utilize oil driven out of a confined area by a piston. The oil leaves this confined area through a series of pre-established orfices. As the plunger or piston is moved by the load which is being decelerated, the total remaining available orifice area is progressively diminished. The rate at which the oil is allowed to escape is dependent strictly upon size and shape of the orifices which are in the plunger through which the oil escapes. The arrangement of the orifices or openings is fixed accordingly to the momentum of the load to be decelerated.

One major difficulty poses a serious problem not within the range of this type of cushion to control. A change in speed or mass of the load which is to be stopped has a direct effect upon the ability of the cushion to perform its work effectively. Because the size of the orifices are fixed in prior devices, any change in load will change the cushioning effect.

In order to overcome this problem with prior cushions, it is necessary that the orifices be changed or the plunger be replaced with a new plunger with the proper orifice arrangement to meet the new conditions. This method is rather impractical as the load requirements change from time to time.

On a molding line, there are many different applications of the same basic cushion. Some cushions stop an entire mold with a casting in it, another stops one-half a mold with sand in it, another may stop empty flasks, or the cushion may stop an entire line of flasks, half molds. It is even desirable to use the cushions as an integral part of some of the basic molding or handling equipment itself so as to cushion some of the moving parts in order to prevent damage to the equipment. This is particularly true in high speed operations or production.

The present invention provides a variable orifice arrangement without any costly or time consuming change. This allows for changes in speeds in the line or in any part of the line.

Another major problem with existing cushions is the fact that in one molding line, there may be a number of different cushions. All of the cushions are basically the same except for the plungers or pistons with the fixed orifice arrangement. This means that many records must be maintained as well as spare parts in inventory for the customer in order to keep his line operating with a minimum of down time. It requires an increased inventory in order to be able to service the customer's repair part program.

The present invention provides adjustable orifices in a fixed location. The movement of the piston determines how many orifices are open to the oil at a given time. The size of the orifices is adjustable. This adjustment is made externally and it is possible to change the decelerating ability to meet or to match changes in momentum of the device to be stopped.

Each cushion, depending upon its size or volume of oil to be metered, has a certain range of capacity which can handle the decelerating of loads of a wide range of momentum. This means that there is a maximum limit to the kinetic energy that a given cushion can absorb and stop effectively. By varying the orifices, it is possible to extend the range of application from this maximum to almost any degree of cushioning action required for a wide range of lesser momentum or gross kinetic energy.

It is, accordingly, an object of the present invention to provide an improved cushioning device.

Another object of the invention is to provide a cushioning device which is simple in construction, economical to manufacture, and simple and efficient in operation.

With the above and other objects in view, the present invention consists of the combination and arrangement of parts hereinafter more fully described, illustrated in the accompanying drawing and more particularly pointed out in the appended claim, it being understood that changes may be made in the form, size, proportions, and minor details of construction without departing from the spirit or sacrificing any of the advantages of the invention.

Figure 1:
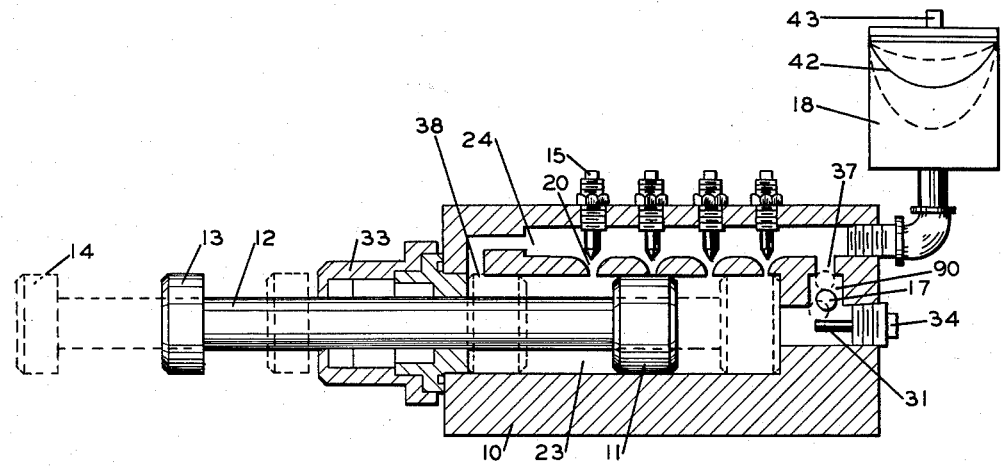
FIG. 1 is a longitudinal cross sectional view of a cushioning device according to the invention.

Now with more particular reference to the drawing, the cushioning device shown in FIG. 1 consists of a body 10 which has a hollow cylindrical bore therein extending from one end and closed at the other. The bore is closed at one end by a sealing arrangement 33. The threaded hole at the opposite end is closed by a plug 34. A piston 11 is slidable in the hollow cylindrical cavity and it has a piston rod 12 thereon which extends out through the sealing device 33 and terminates in a bumper 13. A manifold 24 connects a reservoir 18, a passage 37, and an opening 38. The piston 11 may be forced from the position shown to the position indicated in phantom lines 14 when it is engaged by a load to be stopped.

Needle valves 15 are threadably received in the outer bore of the body 10 and they extend into orifice like ends which are complementary in shape to the valve seats of the orifices so that the rate of flow of fluid through the orifices to the manifold can be regulated. A ball check 17 is received in a counterbore 90. This ball check will prevent fluid from flowing from the head end of the piston 11 to the manifold 24 but will allow fluid to freely flow back to the head end of the piston. A pin 31 on the end of the plug 34 limits the downward movement of the ball check 17 so that the ball will not fall out of the counterbore.

The reservoir 18 has a rubber diaphragm 42 stretched across the top of it. Air under pressure may be inserted through a plug 43 to force oil out of the reservoir 18 into the space ahead of the piston.

The purpose of the ball check is to act as a one-way valve or control to permit a free flow of oil from outside the oil chamber into the oil chamber and to restrict or stop the flow of oil out of the chamber.

When the piston rod 12 and piston 11 are in the position shown in phantom lines, the piston may be driven by the load back into the cushion. There may be any number of needle valves 15, depending upon the size of the cushion, degree of control necessary, length of stroke, etc.

As the piston 11 is driven further back into the cushion by a load, the oil is forced out of the chamber through the needle valves 15. The oil meters into the manifold 24 and the oil now follows two different paths. Some of the oil returns to a cylinder 23 to the cavity formed in front of the piston 11 as it moves backward. Because there is a piston rod in the chamber in front of the piston 11, the volume is less than the volume of the oil chamber behind the piston. The difference in volume is then driven or forced into the oil reservoir 18.

As the piston 11 drives further into the body 10, it covers up or shuts off one needle valve 15 at a time, leaving progressively fewer needle valves through which the oil can escape. Thus, by properly spacing and controlling the size of the orifice at these various needle valves, it is possible to achieve the desired oil metering effect for most applications.

As the piston moves to the right, the ball check 17 will be seated and all of the oil will flow through orifice 20. After the piston has moved entirely to the right by the load, it must be recocked.

Because of the fact that the piston rod 12 occupies some of the area in the front side of the piston 11, there is a pressure differential on the two sides of the piston, the pressure per square inch being the same on both sides of the piston. Because of the total pressure differential, the greater pressure is on the rear side of the piston. The piston is driven forward and the cushion is recocked.

The cushion may be mounted in almost any position and will work either vertically or horizontally. Because of the basic design of a one piece body, the cushion is more rugged and stronger in its construction. With this type of cushion, it is possible to maintain pressure continuously on the top of the reservoir so that the moment the load is removed from the cushion, the cushion is automatically recocked.

This action may not always be desirable in applications where the load is not moving back out of position in a line opposite to its entry into the cushion. If the load moves sideways or up and down, it is possible to release the air pressure on the reservoir as soon as the cushion has been cocked. In this manner, the load can be decelerated to a smooth stop and, by timing when the air is put back on the reservoir, the time that the cushion is recocked is controlled. This is a vital feature in many applications.

Figure 2:
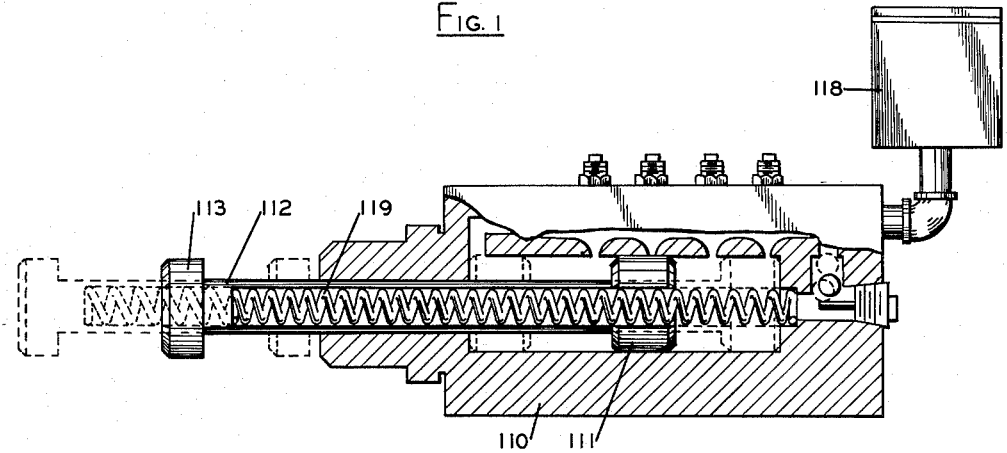
FIG. 2 is a view similar to FIG. 1 showing another embodiment of the invention.

FIG. 2 shows a cushion basically the same as FIG. 1, the exception being that a spring 119 is used to cock the cushion and an oil reservoir 118 no longer has a diaphragm in it.

The spring 119 is seated in the rear of a body 110 and a piston rod 112 has a long hollow stem into which the spring 119 enters. This type of cushion will recock itself automatically as soon as the load is removed from a bumper 113.

Figure 3:
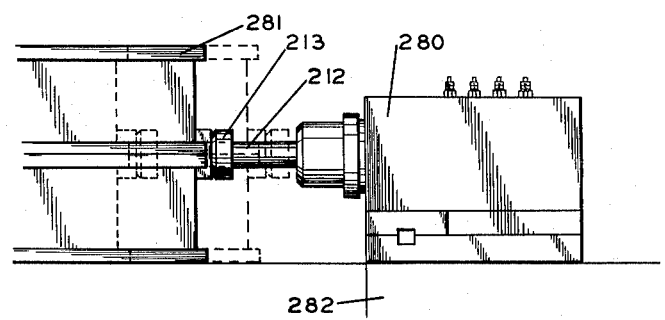
FIG. 3 is a view of the cushioning device assembled on a molding machine constituting another embodiment of the invention.

FIG. 3 shows the application of a cushion assembly 280 similar internally to the cushion shown in FIGS. 1 and 2. The assembly 280 is mounted on a piece of equipment 282, stopping a flask 281. In this instance, the flask, indicated schematically as moving along a track 283, contacts a bumper 213. The bumper, in turn, pushes a piston rod 212 to obtain the desired decelerating action to bring it gently to a stop.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows:

A shock absorber comprising a body, a piston in said body, a piston rod in said body attached to said piston and having an end extending from said body and adapted to engage a load to be checked, means to urge said piston to a position where said piston rod is extended from said body, said piston defining a cavity, said cavity comprising a cylindrical opening in said body, said piston being slidably disposed in said opening and providing a space for fluid in said cavity, both ahead and behind said piston, a plurality of axially spaced orifices extending through the walls of said body, one at one end and one at the other end thereof, means to adjust the effective size of said orifices whereby the rate of flow of fluid therethrough may be regulated, a manifold connecting said orifices, a flow passage connecting the end of said opening through said body remote from said rod to said manifold, a ball check disposed in said flow passage, said ball check being adapted to allow fluid to flow freely from the side of said piston adjacent said rod through said manifold to the side of said piston remote from said rod, but preventing said fluid from escaping through said passage from said side of said piston opposite said rod to said manifold, and a plug in said body in the end thereof remote from said rod, a pintle attached to said plug and extending toward said piston and underlying said flow passage, said ball check being adapted to rest on said pintle when said piston is moved in the direction of said rod.

References Cited by the Examiner

UNITED STATES PATENTS

| | | | |
|---|---|---|---|
| 713,267 | 11/02 | Wolf | 188—97 |
| 1,473,692 | 11/23 | Atkinson | 188—69.9 |
| 1,494,135 | 5/24 | Robison et al. | 188—88.51 |
| 1,570,479 | 1/25 | Goldensky et al. | 188—88.51 |
| 1,575,973 | 3/26 | Coleman | 188—88.51 |
| 1,963,430 | 6/34 | Zarafu | 188—97 X |
| 1,991,676 | 2/35 | Huwyler | 188—97 |
| 2,401,275 | 5/46 | Richards et al. | 188—97 |
| 3,036,844 | 5/62 | Vogel | 267—64 X |

ARTHUR L. LA POINT, *Primary Examiner.*

EUGENE G. BOTZ, *Examiner.*